US012779542B2

(12) United States Patent
Ouchi et al.

(10) Patent No.: US 12,779,542 B2
(45) Date of Patent: Nov. 3, 2026

(54) ADDITIVE MANUFACTURING APPARATUS, MULTI-TASKING APPARATUS, METHOD FOR CONTROLLING ADDITIVE MANUFACTURING APPARATUS, AND COMPUTER-READABLE STORAGE MEDIUM STORING CONTROL PROGRAM FOR ADDITIVE MANUFACTURING APPARATUS

(71) Applicant: Yamazaki Mazak Corporation, Niwa-gun (JP)

(72) Inventors: Seigo Ouchi, Niwa-gun (JP); Kohei Asano, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 644 days.

(21) Appl. No.: 18/307,811

(22) Filed: Apr. 27, 2023

(65) Prior Publication Data

US 2024/0033828 A1 Feb. 1, 2024

Related U.S. Application Data

(63) Continuation of application No. PCT/JP2020/041584, filed on Nov. 6, 2020.

(51) Int. Cl.
*B22F 12/57* (2021.01)
*B22F 10/25* (2021.01)
(Continued)

(52) U.S. Cl.
CPC .............. *B22F 12/57* (2021.01); *B22F 10/25* (2021.01); *B22F 10/30* (2021.01); *B22F 12/82* (2021.01);
(Continued)

(58) Field of Classification Search
CPC ...................................................... B22F 12/50
See application file for complete search history.

(56) References Cited

U.S. PATENT DOCUMENTS 6,370,936 B1 4/2002 Yamagishi et al.
7,045,738 B1 * 5/2006 Kovacevic ........... B23K 26/342 219/121.64
(Continued)

FOREIGN PATENT DOCUMENTS

CN 105568277 5/2016
CN 111496253 8/2020
(Continued)

OTHER PUBLICATIONS

Lipták, Béla. (2003). Instrument Engineers' Handbook (4th Edition)—Process Measurement and Analysis, vol. 1—1.8.1.8 Calibration Intervals. Taylor & Francis. (Year: 2003).*
(Continued)

*Primary Examiner* — Jophy S. Koshy
*Assistant Examiner* — Joshua S Carpenter
(74) *Attorney, Agent, or Firm* — MORI & WARD, LLP

(57) ABSTRACT

An additive manufacturing apparatus includes a powder feeder to feed powder, a head to discharge the powder, a first flow passage connecting the powder feeder and the head, a flow passage switching valve provided disposed in the first flow passage, a reservoir tank configured to receive the powder fed from the powder feeder, a second flow passage connecting the flow passage switching valve to the reservoir tank, a first sensor, and a second sensor. The flow passage switching valve is configured to take a first position and a second position alternatively. The powder feeder is connected to the head via the first flow passage in the first position to supply the powder to the head. The powder feeder is connected to the reservoir tank via the second flow
(Continued)

passage in the second position to supply the powder to the reservoir tank.

13 Claims, 10 Drawing Sheets

(51) Int. Cl.

| | |
|---|---|
| ***B22F 10/30*** | (2021.01) |
| ***B22F 12/82*** | (2021.01) |
| ***B22F 12/90*** | (2021.01) |
| ***B33Y 10/00*** | (2015.01) |
| ***B33Y 30/00*** | (2015.01) |
| ***B33Y 40/20*** | (2020.01) |
| ***B33Y 50/02*** | (2015.01) |

(52) U.S. Cl.

CPC .............. *B22F 12/90* (2021.01); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | |
|---|---|---|---|
| 2012/0145683 A1 | 6/2012 | Miyagi et al. | |
| 2013/0088716 A1 | 4/2013 | Romanin et al. | |
| 2016/0121428 A1 | 5/2016 | Sato et al. | |
| 2017/0028631 A1* | 2/2017 | Hyatt | B22F 10/73 |
| 2020/0079015 A1 | 3/2020 | Soshi | |
| 2022/0283008 A1 | 9/2022 | Bax et al. | |

FOREIGN PATENT DOCUMENTS

| | | |
|---|---|---|
| CN | 211758466 | 10/2020 |
| JP | 11-033759 | 2/1999 |
| JP | 11-326161 | 11/1999 |
| JP | 2006-102708 | 4/2006 |
| JP | 2010-121938 | 6/2010 |
| JP | 2012-125772 | 7/2012 |
| JP | 2014-528584 | 10/2014 |
| JP | 2020-037240 | 3/2020 |
| WO | WO 2020/260478 | 12/2020 |
| WO | WO 2021/028215 | 2/2021 |

OTHER PUBLICATIONS

Lan Gibson, Ian Gibson. "Additive manufacturing technologies 3D printing, rapid prototyping, and direct digital manufacturing." (2015). (Year: 2015).*

Supplementary European Search Report for corresponding EP Application No. 20960834.8-1103, Oct. 31, 2023.

European Office Action for corresponding EP Application No. 20960834.8-1103, Nov. 13, 2023.

International Search Report for corresponding International Application No. PCT/JP2020/041584, Nov. 19, 2021.

Written Opinion for corresponding International Application No. No. PCT/JP2020/041584, Nov. 19, 2021.

Japanese Office Action for corresponding JP Application No. 2021-504483, Apr. 5, 2021 (w/ English machine translation).

Japanese Office Action for corresponding JP Application No. 2021-504483, Jul. 6, 2021 (w/ English machine translation).

The International Preliminary Report on Patentability (Chapter I) with translation of Written Opinion of the International Searching Authority for corresponding International Application No. PCT/JP2020/041584, May 8, 2023.

Chinese Office Action for corresponding CN Application No. 202080106655.0, Aug. 28, 2023.

European Office Action for corresponding EP Application No. 20960834.8-1103, Jun. 25, 2024.

* cited by examiner

ADDITIVE MANUFACTURING APPARATUS, MULTI-TASKING APPARATUS, METHOD FOR CONTROLLING ADDITIVE MANUFACTURING APPARATUS, AND COMPUTER-READABLE STORAGE MEDIUM STORING CONTROL PROGRAM FOR ADDITIVE MANUFACTURING APPARATUS

CROSS-REFERENCE TO RELATED APPLICATIONS

The present application is a continuation application of International Application No. PCT/JP2020/041584, filed Nov. 6, 2020. The contents of this application are incorporated herein by reference in their entirety.

BACKGROUND OF THE INVENTION

Field of the Invention

The present invention relates to an additive manufacturing apparatus, a multi-tasking apparatus, a method for controlling the additive manufacturing apparatus, and a computer-readable storage medium storing a control program for the additive manufacturing apparatus.

Discussion of the Background

U.S. Pat. No. 7,045,738 describes an additive manufacturing apparatus that detects the flow rate of powder using an optical sensor. To calibrate the accuracy of the optical sensor, a weigher is placed below a nozzle, and the weigher is removed after calibration work.

SUMMARY OF THE INVENTION

According to one aspect of the present invention, an additive manufacturing apparatus includes a powder feeder, a head, a first flow passage, a flow passage switching valve, a reservoir tank, a second flow passage, a first sensor, and a second sensor. The powder feeder is configured to feed powder using a carrier gas. The head is configured to discharge the powder. The first flow passage connects the powder feeder and the head. The flow passage switching valve is provided in the first flow passage. The reservoir tank is configured to receive the powder fed from the powder feeder. The second flow passage connects the flow passage switching valve to the reservoir tank. The first sensor is provided in the first flow passage between the flow passage switching valve and the head to detect a first flow rate of the powder flowing to the head. The second sensor is provided in the second flow passage to detect a second flow rate of the powder flowing to the reservoir tank. The flow passage switching valve is configured to take a first position and a second position alternatively. The powder feeder is connected to the head via the first flow passage in the first position to supply the powder to the head. The powder feeder is connected to the reservoir tank via the second flow passage in the second position to supply the powder to the reservoir tank.

According to another aspect of the present invention, a multi-tasking apparatus includes the above-described additive manufacturing apparatus and a cutting device configured to perform a cutting process.

According to further aspect of the present invention, a method for controlling an additive manufacturing apparatus includes supplying powder from a powder feeder that is operated under a predetermined operating condition to a first flow passage, which connects the powder feeder to a head, to discharge the powder from the head. The powder flowing through the first flow passage is detected using a first sensor. A first flow rate of the powder flowing to the head is calculated based on an output of the first sensor. A flow passage through which the powder is to be fed from the powder feeder is switched from the first flow passage to a second flow passage, which connects the powder feeder to a reservoir tank. The powder is fed from the powder feeder that is operated under the predetermined operating condition to the reservoir tank through the second flow passage. The powder flowing through the second flow passage is detected using a second sensor. A second flow rate of the powder flowing to the reservoir tank is calculated based on an output of the second sensor.

According to further aspect of the present invention, a computer-readable storage medium storing a control program for causing an additive manufacturing apparatus to execute a process. The process includes operating a powder feeder under a predetermined operating condition to supply powder to a first flow passage, which connects the powder feeder to a head, to discharge the powder from the head. The process includes acquiring an output of the first sensor that detects the powder flowing through the first flow passage. The process includes calculating a first flow rate of the powder flowing to the head based on the output of the first sensor. The process includes switching a flow passage through which the powder is to be fed from the powder feeder from the first flow passage to a second flow passage, which connects the powder feeder to a reservoir tank. The process includes operating the powder feeder under the predetermined operating condition to feed the powder to the second flow passage. The process includes acquiring an output of a second sensor that detects the powder flowing through the second flow passage. The process includes calculating a second flow rate of the powder flowing to the reservoir tank based on the output of the second sensor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
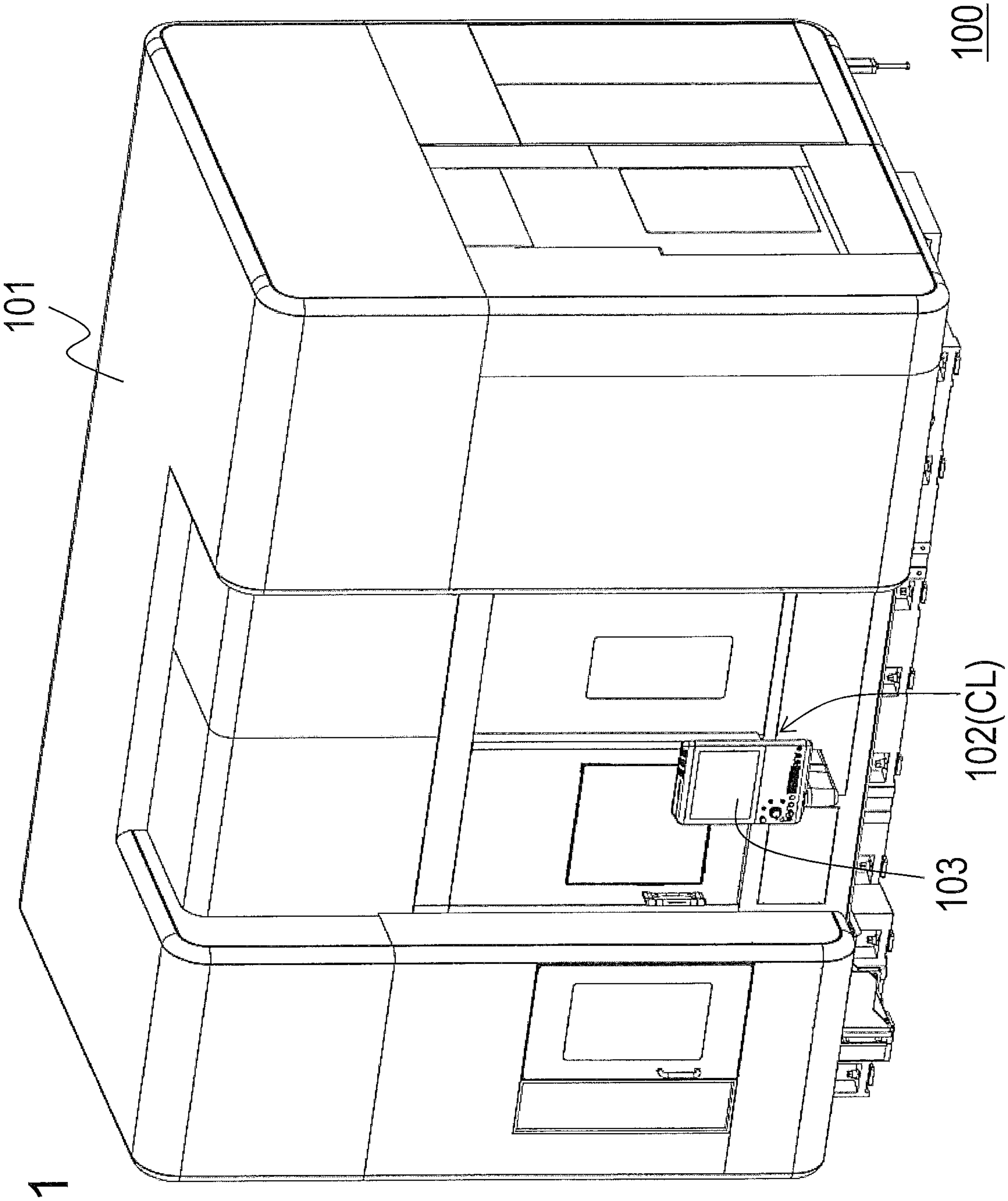
FIG. 1 is a view of a multi-tasking apparatus according to an embodiment illustrating an exterior configuration.

The present invention will now be described in detail with reference to the drawings illustrating embodiments of the present invention. Like reference numerals designate corresponding or approximately identical elements throughout the drawings.

Embodiment

Structure of Multi-Tasking Apparatus 100

FIG. 1 is a view of a multi-tasking apparatus 100 according to an embodiment of the present invention illustrating an exterior configuration. Among multi-tasking apparatuses that are capable of performing multiple machining processes on a workpiece, the multi-tasking apparatus 100 of the present embodiment is the one that can perform additive manufacturing in combination with cutting. The multi-tasking apparatus 100 includes a cover 101 and an operation panel 102. The cover 101 covers pieces of equipment that perform additive manufacturing and cutting. The operation panel 102 includes a notification device 103 for providing information to a user. Specifically, the notification device 103 includes a display that displays information to the user as an image or a speaker that provides information to a user by sound. Besides the above, the operation panel 102 also includes an input device that receives the input from a controller CL for controlling the multi-tasking apparatus 110 or the user. The detailed structure of the controller CL will be described below.

Figure 2:
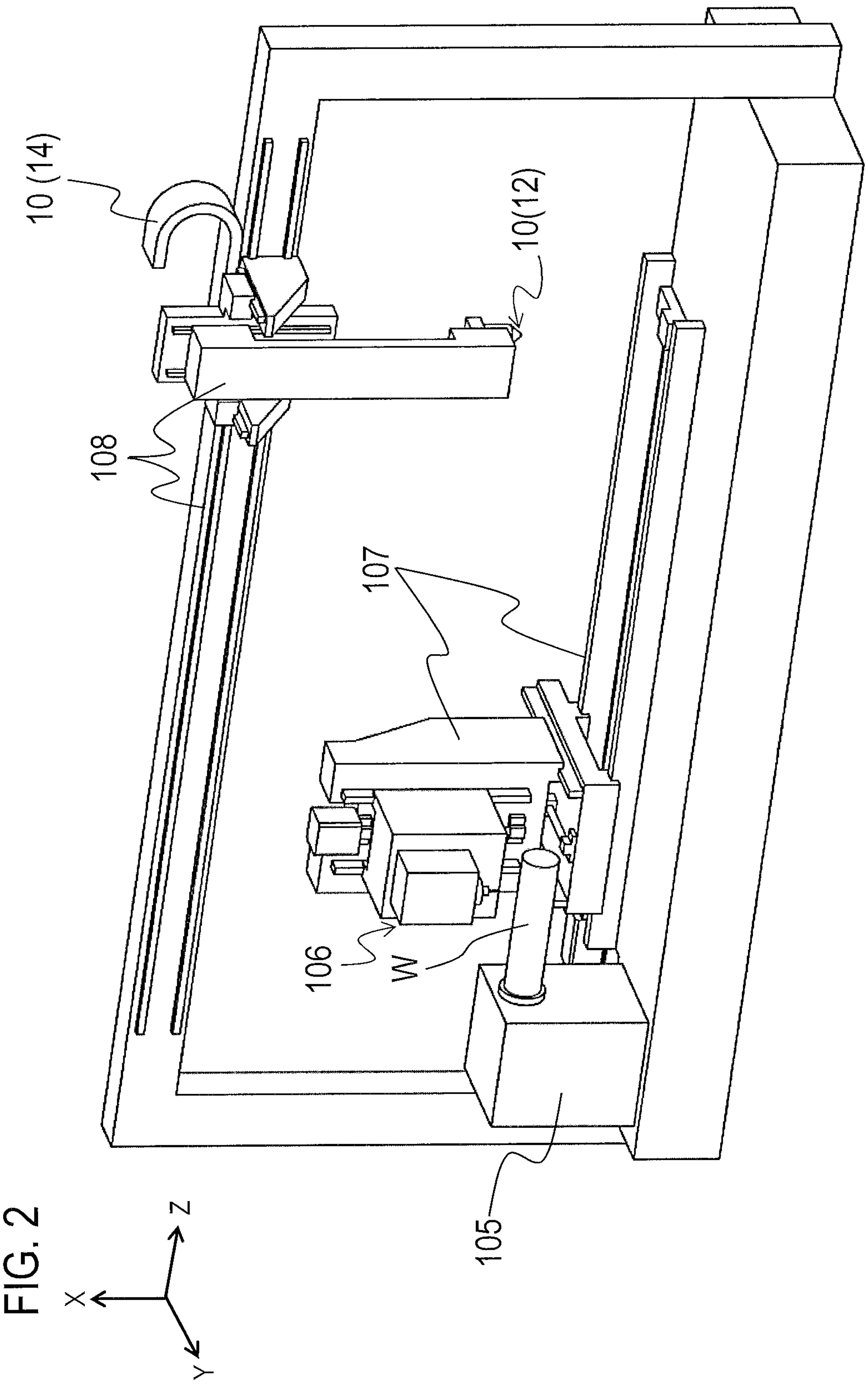
FIG. 2 is a schematic view of the multi-tasking apparatus illustrating the configuration inside a cover.

FIG. 2 is a schematic view of the multi-tasking apparatus 100 illustrating the configuration inside the cover 101. Referring to FIG. 2, the multi-tasking apparatus 100 includes a holding mechanism 105, a cutting device 106, an additive manufacturing apparatus 10, a first movement mechanism 107, and a second movement mechanism 108. The holding mechanism 105 is configured to hold a workpiece W. The cutting device 106 is configured to cut the workpiece W. The additive manufacturing apparatus 10 is configured to perform additive manufacturing on the workpiece W. The first movement mechanism 107 is configured to move the cutting device 106 relative to the workpiece W. The second movement mechanism 108 is configured to move the additive manufacturing apparatus 10 relative to the workpiece W.

FIG. 2 illustrates the position of the cutting device 106 and the additive manufacturing apparatus 10 when the workpiece W is machined using the cutting device 106. The holding mechanism 105 is configured to rotate the workpiece W with respect to a rotation axis parallel to a Z axis in the drawing. The cutting performed by the cutting device 106 includes turning and milling. In turning, a turning tool mounted on a processing head is brought into contact with the workpiece W, which is rotated by the holding mechanism 105, to machine the workpiece W. In milling, a milling tool mounted on the processing head is brought into contact with the workpiece W, which is held still by the holding mechanism 105, with the milling tool being rotated to machine the workpiece W. However, the cutting device 106 may perform cutting processes other than the above-mentioned cutting processes. Furthermore, the multi-tasking apparatus 100 may include a special machining device such as a laser cutter or other machining devices such as a polisher.

The first movement mechanism 107 can move the cutting device 106 in an X-axis direction and a Y-axis direction in addition to a Z-axis direction in FIG. 2. The X-axis direction is approximately perpendicular to the Z-axis direction and is the vertical direction. The Y-axis direction is approximately perpendicular to the X-axis direction and the Z-axis direction and is the horizontal direction. Furthermore, the first movement mechanism 107 is capable of turning the cutting device 106 around a rotation axis horizontal to the Y axis.

Figure 3:
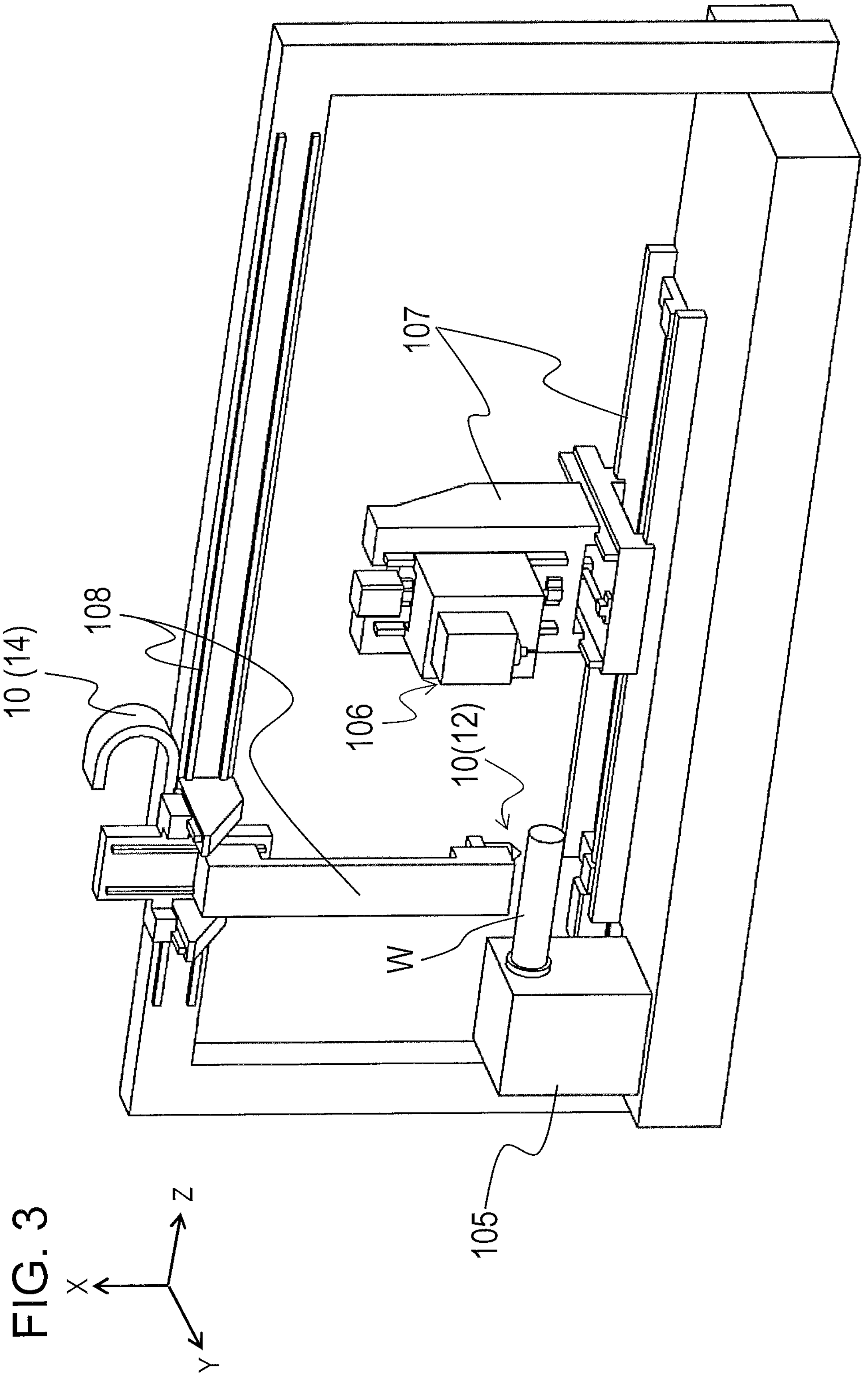
FIG. 3 is another schematic view of the multi-tasking apparatus illustrating the configuration inside the cover.

FIG. 3 illustrates the position of the cutting device 106 and the additive manufacturing apparatus 10 when the workpiece W is machined using the additive manufacturing apparatus 10. The additive manufacturing performed by the additive manufacturing apparatus 10 refers to a technique that, while supplying an additive material to the workpiece W, controls the position where heat is generated by focusing an energy ray such as a laser beam and selectively melts and joins the additive material to the workpiece W. In the present embodiment, the additive material refers to metal powder or ceramic powder. It is to be noted that in the following description, the additive material is described as the powder. Referring to FIGS. 2 and 3, the additive manufacturing apparatus 10 includes a head 12 and a transporting mechanism 14. The head 12 is configured to output the powder and a laser beam. The transporting mechanism 14 is configured to transport the powder, the energy ray, and a carrier gas used for the additive manufacturing to the head 12. It is to be noted that the additive manufacturing apparatus 10 includes other structures, which will be discussed below.

The second movement mechanism 108 can move the additive manufacturing apparatus 10 in the X-axis direction and the Y-axis direction in addition to the Z-axis direction in FIG. 2. Furthermore, the second movement mechanism 108 is capable of turning the additive manufacturing apparatus 10 around a rotation axis horizontal to the Y axis. In replacing the additive manufacturing apparatus 10 with the cutting device 106, the second movement mechanism 108 lifts the additive manufacturing apparatus 10 above the cutting device 106 (in the X-axis positive direction). This allows the locations of the additive manufacturing apparatus 10 and the cutting device 106 to be changed without interfering with each other.

Configuration of Additive Manufacturing Apparatus 10

Figure 4:
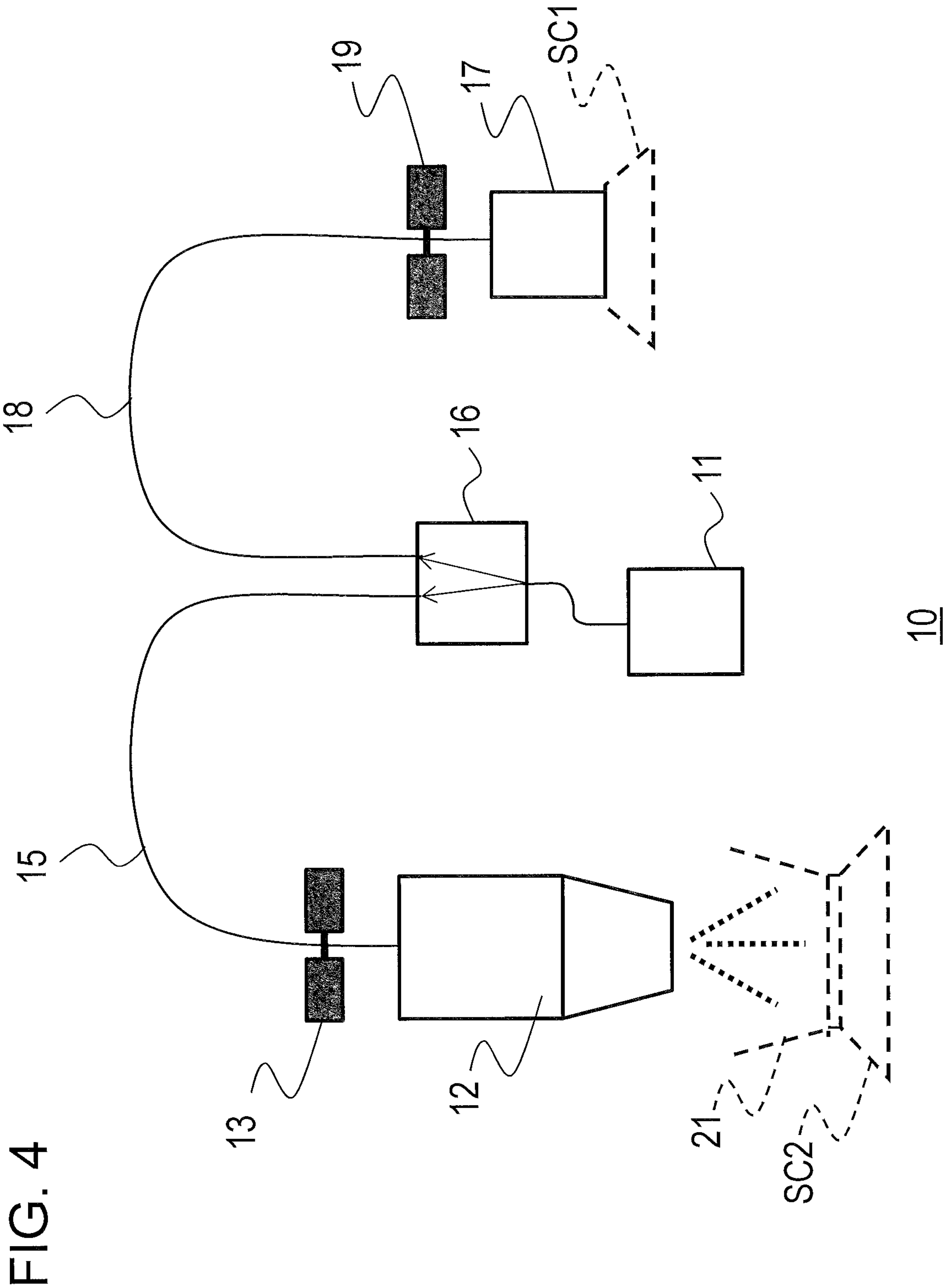
FIG. 4 is a schematic view of an additive manufacturing apparatus.

FIG. 4 is a schematic view of the additive manufacturing apparatus 10. As illustrated in FIG. 4, the additive manufacturing apparatus 10 includes a powder feeder 11, the head 12, a first sensor 13, a first flow passage 15, a flow passage switching valve 16, a reservoir tank 17, a second flow passage 18, and a second sensor 19. The powder feeder 11 is configured to feed the powder using the carrier gas. Specifically, the powder feeder 11 includes a rotatable measurement disk that receives the powder dropped from a powder container and feeds the powder by supplying the carrier gas to the rotatable measurement disk at a predetermined flow rate. The flow rate of the carrier gas is the volume of the gas supplied per unit time. The unit of the flow rate of the carrier gas is, for example, L/min. The power feeder 11 is capable of controlling the flow rate of the powder to be fed by the rotational speed of the rotatable measurement disk. In the present embodiment, the flow rate of the powder is the weight of the powder that flowed through each of the first flow passage 15 and the second flow passage 18 per unit time. The unit of the weight of the powder is, for example, g/min or mg/min. It is to be noted that since the detailed structure of the powder feeder 11 is well known, the detailed description will be omitted.

The additive manufacturing apparatus 10 discharges the powder through the head 12 as described above. The first flow passage 15 is part of the transporting mechanism 14 described above and connects the powder feeder 11 to the head 12. The powder is supplied from the powder feeder 11 to the head 12 through the first flow passage 15. The flow passage switching valve 16 is located in the middle of the first flow passage 15. The reservoir tank 17 is configured to receive the powder fed from the powder feeder 11. The additive manufacturing apparatus 10 may further include a measurement instrument SC1 that is capable of measuring the amount of powder that accumulates in the reservoir tank 17. For example, the measurement instrument SC1 is a weight scale that measures the weight of the powder that accumulates in the reservoir tank 17.

The second flow passage 18 connects the flow passage switching valve 16 to the reservoir tank 17. The powder flows from the powder feeder 11 to the reservoir tank 17 through the second flow passage 18. The flow passage switching valve 16 is capable of alternatively selecting whether to supply the powder from the powder feeder 11 to the head 12 or to the reservoir tank 17. It is to be noted that FIG. 4 illustrates the flow passage switching valve 16 on the outside of the powder feeder 11, but the flow passage switching valve 16 may be located inside the powder feeder 11. For example, the powder feeder 11 may include a first port connected to the first flow passage 15 and a second port connected to the second flow passage 18. The flow passage switching valve 16 may be located between an internal space of the powder feeder 11 where the above-described rotatable measurement disk is stored and the first and second ports. In this case, the passage from the internal space of the powder feeder 11 to the first port is also understood as part of the first flow passage 15.

The first sensor 13 is located in the first flow passage 15 between the flow passage switching valve 16 and the head 12. The first sensor 13 is configured to detect a first flow rate of the powder flowing to the head 12. The second sensor 19 is located in the second flow passage 18 and is configured to detect a second flow rate of the powder flowing to the reservoir tank 17. The first sensor 13 and the second sensor 19 are preferably optical sensors. It is to be noted, however, that the first sensor 13 and the second sensor 19 may be other kinds of sensors that can measure the flow rate of the powder. For example, the first sensor 13 and the second sensor 19 may be an ultrasonic flow meter, an impeller flow meter, or other flow meters. When the first sensor 13 and the second sensor 19 are optical sensors, transmissive windows are preferably provided at a position in the first flow passage 15 where the first sensor 13 is located and a position in the second flow passage 18 where the second sensor 19 is located. The light from the optical sensors passes through the transmissive windows. It is to be noted that the first flow passage 15 and the second flow passage 18 may be pipes made of material that allows the light to pass through. In this case, the section of the pipe corresponding to the position in the first flow passage 15 where the first sensor 13 is located and the section of the pipe corresponding to the position in the second flow passage 18 where the second sensor 19 is located are equivalent to the transmissive windows described above.

Figure 6:
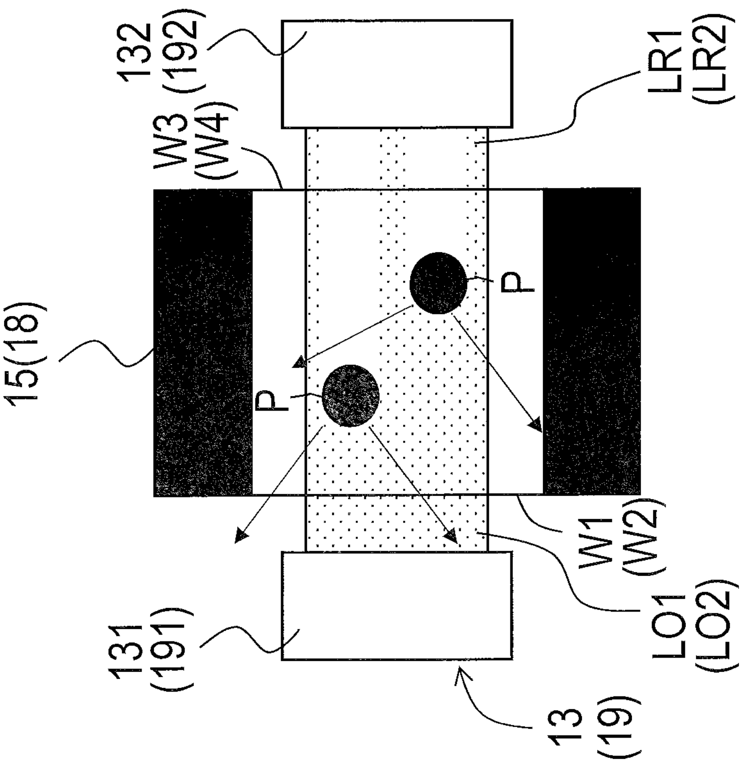
FIG. 6 is an enlarged view of the optical sensor and the surrounding structure illustrating the principle of the flow rate measurement performed by the optical sensor.
Figure 5:
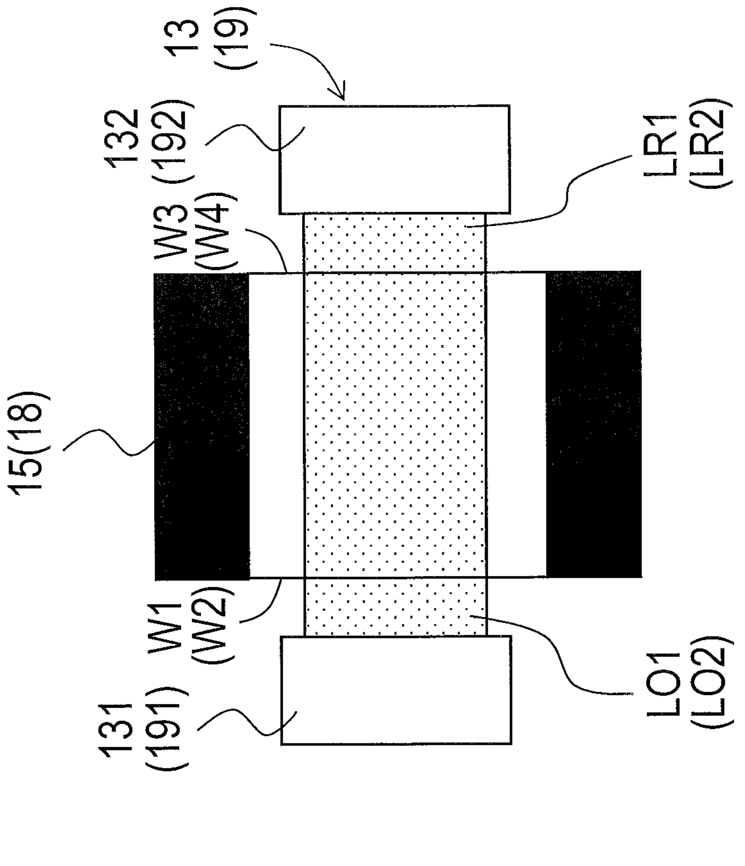
FIG. 5 is an enlarged view of an optical sensor and the surrounding structure illustrating the principle of flow rate measurement performed by the optical sensor.

FIGS. 5 and 6 are enlarged views of the optical sensor and the surrounding structure. As illustrated in FIGS. 5 and 6, the first sensor 13 includes a light emitter 131 and a light receiver 132. The second sensor 19 includes a light emitter 191 and a light receiver 192. The light emitters 131 and 191 are configured to emit measurement light beams LO1 and LO2, respectively. The first flow passage 15 includes a first transmissive window W1 that allows the light of the first sensor 13 to pass through. The second flow passage 18 includes a second transmissive window W2 that allows the light of the second sensor 19 to pass through. Furthermore, the first flow passage 15 includes a third transmissive window W3 that allows the light inside the first flow passage 15 to be transmitted to the outside of the first flow passage 15. The second flow passage 18 includes a fourth transmissive window W4 that allows the light inside the second flow passage 18 to be transmitted to the outside of the second flow passage 18.

As illustrated in FIGS. 5 and 6, the first transmissive window W1 is configured to allow the measurement light beam LO1 to be transmitted to the inside of the first flow passage 15. The second transmissive window W2 is configured to allow the measurement light beam LO2 to be transmitted to the inside of the second flow passage 18. The light beam LO1 and the light beam LO2 preferably have a wavelength that is not easily absorbed by the particles of the powder flowing through the first flow passage 15 and the second flow passage 18. The first transmissive window W1 and the second transmissive window W2 may be anything as long as the light beam LO1 and the light beam LO2 are allowed to pass through. It is to be noted, however, that the first transmissive window W1 preferably has a high transmittance for the light beam LOL. The second transmissive window W2 preferably has a high transmittance for the light beam LO2. The light beam LO1 and the light beam LO2 are preferably light beams that have approximately the same properties and approximately the same intensity. The light beams having approximately the same properties means that the peak wavelength and the wavelength band are approximately the same. The approximately the same intensity means that the intensity at each wavelength in the wavelength band is approximately the same. For example, when the first sensor 13 and the second sensor 19 are the same products and are operating properly, the light beam LO1 and the light beam LO2 are regarded as the light beams having approximately the same properties and approximately the same intensity. When the difference in the peak wavelength or the wavelength band between the light beam LO1 and the light beam LO2 is within the range of variation of the same products, the peak wavelengths or the wavelength bands are regarded as approximately the same. Similarly, when the difference in the intensity at each wavelength in the wavelength band between the light beam LO1 and the light beam LO2 is within the range of variation of the same products, the intensities at each wavelength in the wavelength band are regarded as approximately the same.

The third transmissive window W3 is configured to allow a light beam LR1 inside the first flow passage 15 to be transmitted to the outside of the first flow passage 15. The fourth transmissive window W4 is configured to allow a light beam LR2 inside the second flow passage 18 to be transmitted to the outside of the second flow passage 18. The third transmissive window W3 and the fourth transmissive window W4 may be anything as long as the light beam LR1 and the light beam LR2 are allowed to pass through. It is to be noted, however, that the third transmissive window W3 preferably has a high transmittance for the light beam LR1. The fourth transmissive window W4 preferably has a high transmittance for the light beam LR2. The first transmissive window W1 is preferably made of approximately the same material as the third transmissive window W3. The first transmissive window W1 preferably has approximately the same thickness as the third transmissive window W3. The second transmissive window W2 is preferably made of approximately the same material as the fourth transmissive window W4. The second transmissive window W2 preferably has approximately the same thickness as the fourth transmissive window W4. Furthermore, the first transmissive window W1, the second transmissive window W2, the third transmissive window W3, and the fourth transmissive window W4 are preferably made of the same material and have a high transmittance for the light beam LO1, the light beam LO2, the light beam LR1, and the light beam LR2. For example, the first transmissive window W1, the second transmissive window W2, the third transmissive window W3, and the fourth transmissive window W4 are preferably made of material that has a transmittance of 90% or more for the light beam having the wavelength corresponding to the light beam LO1, the light beam LO2, the light beam LR1, and the light beam LR2. Furthermore, the first transmissive window W1, the second transmissive window W2, the third transmissive window W3, and the fourth transmissive window W4 preferably have approximately the same thickness and are preferably thin. Thus, the first flow passage 15 and the second flow passage 18 may be formed of light transmissive pipes of the same product. In this case, the section of the light transmissive pipe corresponding to the position in the first flow passage 15 where the first sensor 13 is located and the section of the light transmissive pipe corresponding to the position in the second flow passage 18 where the second sensor 19 is located are equivalent to the first transmissive window W1, the second transmissive window W2, the third transmissive window W3, and the fourth transmissive window W4.

Next, the measurement principle of the optical sensors will be described. As illustrated in FIG. 5, when the powder is not flowing through the first flow passage 15, the light beam LO1 reaches the light receiver 132 with hardly any attenuation. Similarly, when the powder is not flowing through the second flow passage 18, the light beam LO2 reaches the light receiver 192 with hardly any attenuation. That is, the difference between the intensity of the light beam LO1 and the intensity of the light beam LR1 is small. The difference between the intensity of the light beam LO2 and the intensity of the light beam LR2 is small. As illustrated in FIG. 6, however, when powder P is flowing, the light hits the powder P and is scattered, which decreases the intensity of the light. That is, the difference between the intensity of the light beam LO1 and the intensity of the light beam LR1 is increased, and the difference between the intensity of the light beam LO2 and the intensity of the light beam LR2 is increased. Since the powder P does not necessarily flow uniformly, the signals of the light receiver 132 and the light receiver 192 are time-varying. However, when the signals from the light receiver 132 and the light receiver 192 are filtered through, for example, a movement-average filter, the processed signals generally change linearly with respect to the flow rate of the powder flowing through the first flow passage 15 and the flow rate of the powder flowing through the second flow passage 18.

Thus, the relationship between the output of the first sensor 13 and the first flow rate of the powder flowing through the first flow passage 15 can be described using a mathematical model. In the following description, the mathematical model is referred to as a first mathematical model MD1. Similarly, the relationship between the output of the second sensor 19 and the second flow rate of the powder flowing through the second flow passage 18 can be described using a mathematical model. In the following description, the mathematical model is referred to as a second mathematical model MD2. More strictly, the first mathematical model MD1 is the model that describes the relationship between the value obtained by filtering the output of the first sensor 13 and the first flow rate of the powder flowing through the first flow passage 15. The second mathematical model MD2 is the model that describes a relationship between the value obtained by filtering the output of the second sensor 19 and the second flow rate of the powder flowing through the second flow passage 18.

Internal Configuration of Controller CL

Figure 7:
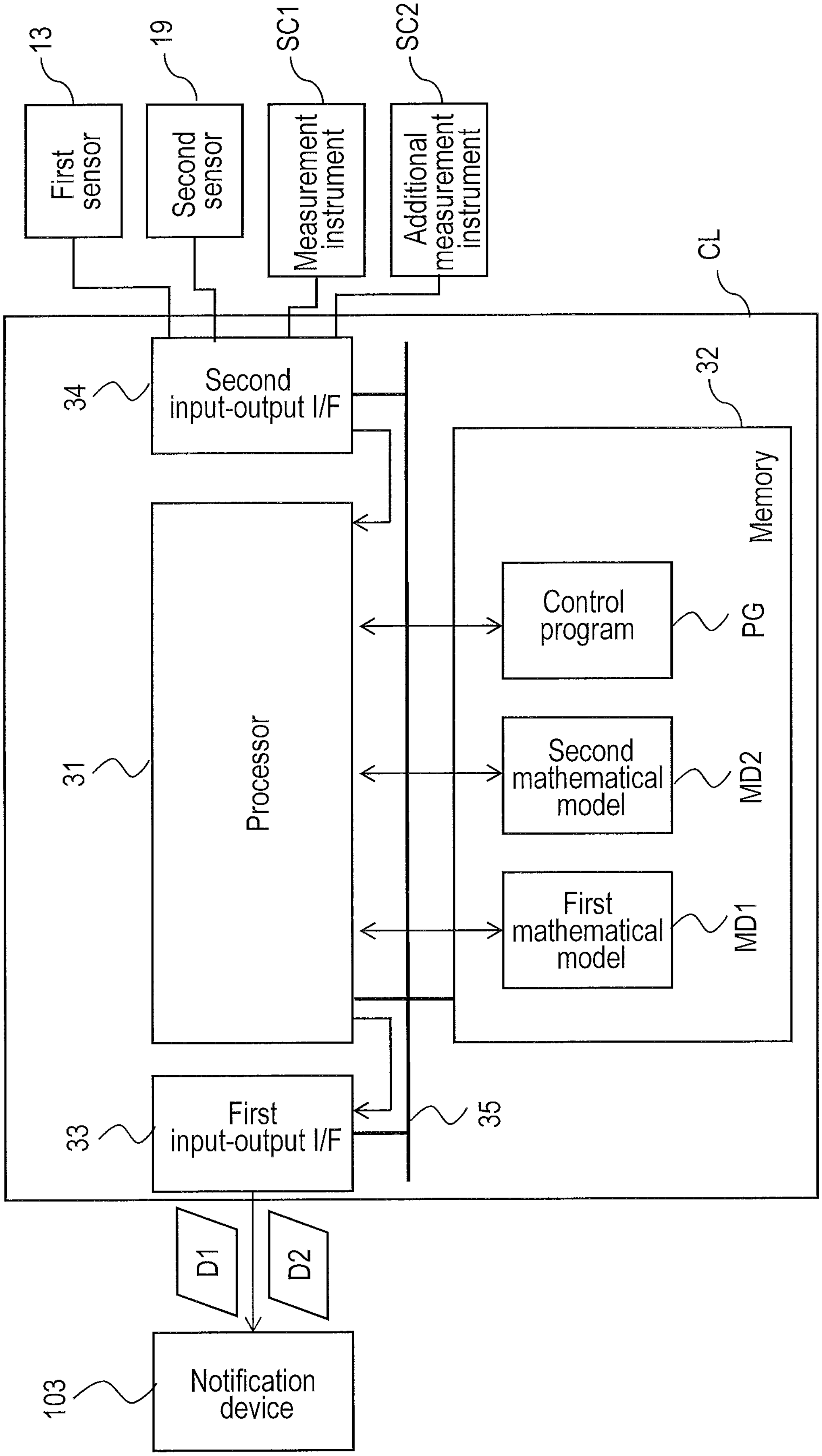
FIG. 7 is a block diagram illustrating the internal configuration of a controller.

FIG. 7 is a block diagram illustrating the internal configuration of the controller CL. Referring to FIG. 7, the controller CL includes a processor 31 and a memory 32. That is, the additive manufacturing apparatus 10 further includes the processor 31 and the memory 32. The memory 32 is configured to store the first mathematical model MD1, which describes the relationship between the output of the first sensor 13 and the first flow rate of the powder, and the second mathematical model MD2, which describes the relationship between the output of the second sensor 19 and the second flow rate of the powder. Furthermore, the memory 32 is configured to store a control program PG for controlling the additive manufacturing apparatus 10. The processor 31 executes the control program PG to, for example, set the operating condition of the powder feeder 11 and switch the flow passage through which the powder flows using the flow passage switching valve 16.

Specifically, the processor 31 is configured to execute the control program PG to calculate the first flow rate from the output of the first sensor 13 based on the first mathematical model MD1 and calculate the second flow rate from the output of the second sensor 19 based on the second mathematical model MD2. That is, the method for controlling the additive manufacturing apparatus 10 includes calculating the first flow rate from the output of the first sensor 13 based on the first mathematical model MD1, which describes the relationship between the output of the first sensor 13 and the first flow rate of the powder, and calculating the second flow rate from the output of the second sensor 19 based on the second mathematical model MD2, which describes the relationship between the output of the second sensor 19 and the second flow rate of the powder. The control program PG causes the processor 31 to execute processes of calculating the first flow rate from the output of the first sensor 13 based on the first mathematical model MD1, which describes the relationship between the output of the first sensor 13 and the first flow rate of the powder, and calculating the second flow rate from the output of the second sensor 19 based on the second mathematical model MD2, which describes the relationship between the output of the second sensor 19 and the second flow rate of the powder.

Furthermore, the processor 31 is configured to determine whether there is an abnormality in the additive manufacturing apparatus 10 by comparing the output of the first sensor 13 when the powder is supplied from the powder feeder 11, which is operated under a predetermined operating condition, to the first flow passage 15 with the output of the second sensor 19 when the powder is supplied from the powder feeder 11, which is operated under the predetermined operating condition, to the second flow passage 18 through the execution of the control program PG. That is, the method for controlling the additive manufacturing apparatus 10 includes determining whether there is an abnormality in the additive manufacturing apparatus 10 by comparing the output of the first sensor 13 when the powder is supplied from the powder feeder 11, which is operated under the predetermined operating condition, to the first flow passage 15 with the output of the second sensor 19 when the powder is supplied from the powder feeder 11, which is operated under the predetermined operating condition, to the second flow passage 18. The control program PG causes the processor 31 to execute a process of determining whether there is an abnormality in the additive manufacturing apparatus 10 by comparing the output of the first sensor 13 when the powder is supplied from the powder feeder 11, which is operated under the predetermined operating condition, to the first flow passage 15 with the output of the second sensor 19 when the powder is supplied from the powder feeder 11, which is operated under the predetermined operating condition, to the second flow passage 18.

The controller CL further includes, for example, a first input/output interface 33, a second input/output interface 34, a bus 35, and a non-illustrated power supply. The first input/output interface 33 is connected to the notification device 103. The first input/output interface 33 is, for example, a video output interface or a sound output interface. The second input/output interface 34 is connected to the first sensor 13, the second sensor 19, the measurement instrument SC1, and an additional measurement instrument SC2, which will be discussed below, and receives output signals from these devices. The second input/output interface 34 is, for example, a serial interface such as USB or a parallel interface such as RS-232C or SCSI. The bus 35 connects the processor 31, the memory 32, the first input/output interface 33, and the second input/output interface 34 with each other. The bus 35 transmits output signals from the first sensor 13, the second sensor 19, the measurement instrument SC1, and the additional measurement instrument SC2 to the processor 31, transmits signals between the processor 31 and the memory 32, and transmits signals output from the processor 31 to the first input/output interface 33. The signals output from the processor 31 indicate, for example, the first flow rate, the second flow rate, and an abnormality in the additive manufacturing apparatus 10. In FIG. 7, the signals indicating, for example, the first flow rate and the second flow rate are denoted as D1, and the signal indicating an abnormality in the additive manufacturing apparatus 10 is denoted as D2.

Next, the first mathematical model MID and the second mathematical model MD2 will be described. As described above, experience shows that when the signals from the light receiver 132 and the light receiver 192 are filtered through, for example, a movement-average filter, the processed signals generally change linearly with respect to the flow rate of the powder flowing through the first flow passage 15 and the flow rate of the powder flowing through the second flow passage 18. Thus, the first mathematical model MD1 representing the relationship between the first flow rate F1 of the powder flowing through the first flow passage 15 and a signal S1 obtained by filtering the output of the light receiver 132 is expressed by a mathematical expression $S1=K1\times F1+A1$. Similarly, the second mathematical model MD2 representing the relationship between the second flow rate F2 of the powder flowing through the second flow passage 18 and a signal S2 obtained by filtering the output of the light receiver 192 is expressed by a mathematical expression $S2=K2\times F2+A2$. It is to be noted that the first mathematical model MID and the second mathematical model MD2 do not necessarily have to be expressed by such a linear function. Additionally, when the first sensor 13 and the second sensor 19 are the same products, $A1\approx A2$. Furthermore, experience shows that $A1\approx A2\approx 0$.

Generation of First Mathematical Model MD1 and Second Mathematical Model MD2

The first mathematical model MD1 is generated as follows. The flow passage switching valve 16 is in a first position such that the powder from the powder feeder 11 flows through the first flow passage 15. As illustrated in FIG. 4, the additional measurement instrument SC2 including a container 21 is located below the head 12. The container 21 is, for example, a tray. The additional measurement instrument SC2 is a weight scale that measures the weight of the powder that accumulates in the container 21. At the same time as when the powder is discharged from the head 12 at two or more flow rates by changing the rotational speed of the rotatable measurement disk of the powder feeder 11, the output of the first sensor 13 at that time and the changes over time in the weight on the additional measurement instrument SC2 are measured. Based on the value obtained by filtering the output of the first sensor 13 and the corresponding changes over time in the weight on the additional measurement instrument SC2, K1 and A1 can be estimated by maximum likelihood estimation such as a least-square method. That is, the amount of powder discharged from the head 12 to the container 21, which is located opposite to the outlet of the head 12 to receive the powder, is measured, and the first mathematical model MD1 is generated based on the correspondence relationship between the changes in the amount in the container 21 per unit time and the output of the first sensor 13 corresponding to the changes in the container 21. That is, the method for controlling the additive manufacturing apparatus 10 includes measuring the amount of powder discharged from the head 12 to the container 21, which is located opposite to the outlet of the head 12 to receive the powder, and generating the first mathematical model MD1 based on the correspondence relationship between the changes in the amount in the container 21 per unit time and the output of the first sensor 13 corresponding to the changes in the container 21. The control program PG causes the processor 31 to execute processes of acquiring a measured value of the amount of powder discharged from the head 12 to the container 21, which is located opposite to the outlet of the head 12 to receive the powder, and generating the first mathematical model MD1 based on the correspondence relationship between the changes in the amount in the container 21 per unit time and the output of the first sensor 13 corresponding to the changes in the container 21. After the generation of the first mathematical model MID1, the container 21 and the additional measurement instrument SC2 are removed from the additive manufacturing apparatus 10.

The second mathematical model MD2 is generated as follows. The flow passage switching valve 16 is in a second position such that the powder from the powder feeder 11 flows through the second flow passage 18. At the same time as when the powder is discharged to the reservoir tank 17 at two or more flow rates by changing the rotational speed of the rotatable measurement disk of the powder feeder 11, the output of the second sensor 19 at that time and the changes over time in the weight on the measurement instrument SC1 are measured. Based on the value obtained by filtering the output of the second sensor 19 and the corresponding changes over time in the weight on the measurement instrument SC1, K2 and A2 can be estimated by maximum likelihood estimation such as a least-square method. That is, the mathematical model MD2 is generated based on the correspondence relationship between the changes in the amount in the reservoir tank 17 per unit time and the output of the second sensor 19 corresponding to the changes in the reservoir tank 17. That is, the method for controlling the additive manufacturing apparatus 10 includes measuring the amount of powder accumulated in the reservoir tank 17 and generating the second mathematical model MD2 based on the correspondence relationship between the changes in the amount in the reservoir tank 17 per unit time and the output of the second sensor 19 corresponding to the changes in the reservoir tank 17. The control program PG causes the processor 31 to execute processes of acquiring a measured value of the amount of powder accumulated in the reservoir tank 17 and generating the second mathematical model MD2 based on the correspondence relationship between the changes in the amount in the reservoir tank 17 per unit time and the output of the second sensor 19 corresponding to the changes in the reservoir tank 17. It is to be noted that, for a periodic calibration process, which will be discussed below, the processor 31 preferably obtains a ratio β between K2 and K1, that is, β=K1/K2 and stores the ratio β in the memory 32. The difference between K1 and K2 occurs due to the individual differences between the first sensor 13 and the second sensor 19 or the influence on the discharge by connecting the head 12 to the first flow passage 15. However, in broad terms, the ratio β does not change after long use of the additive manufacturing apparatus 10. On this premise, the additive manufacturing apparatus 10 performs the following processes.

Operation of Additive Manufacturing Apparatus 10—Periodic Calibration

Figure 8:
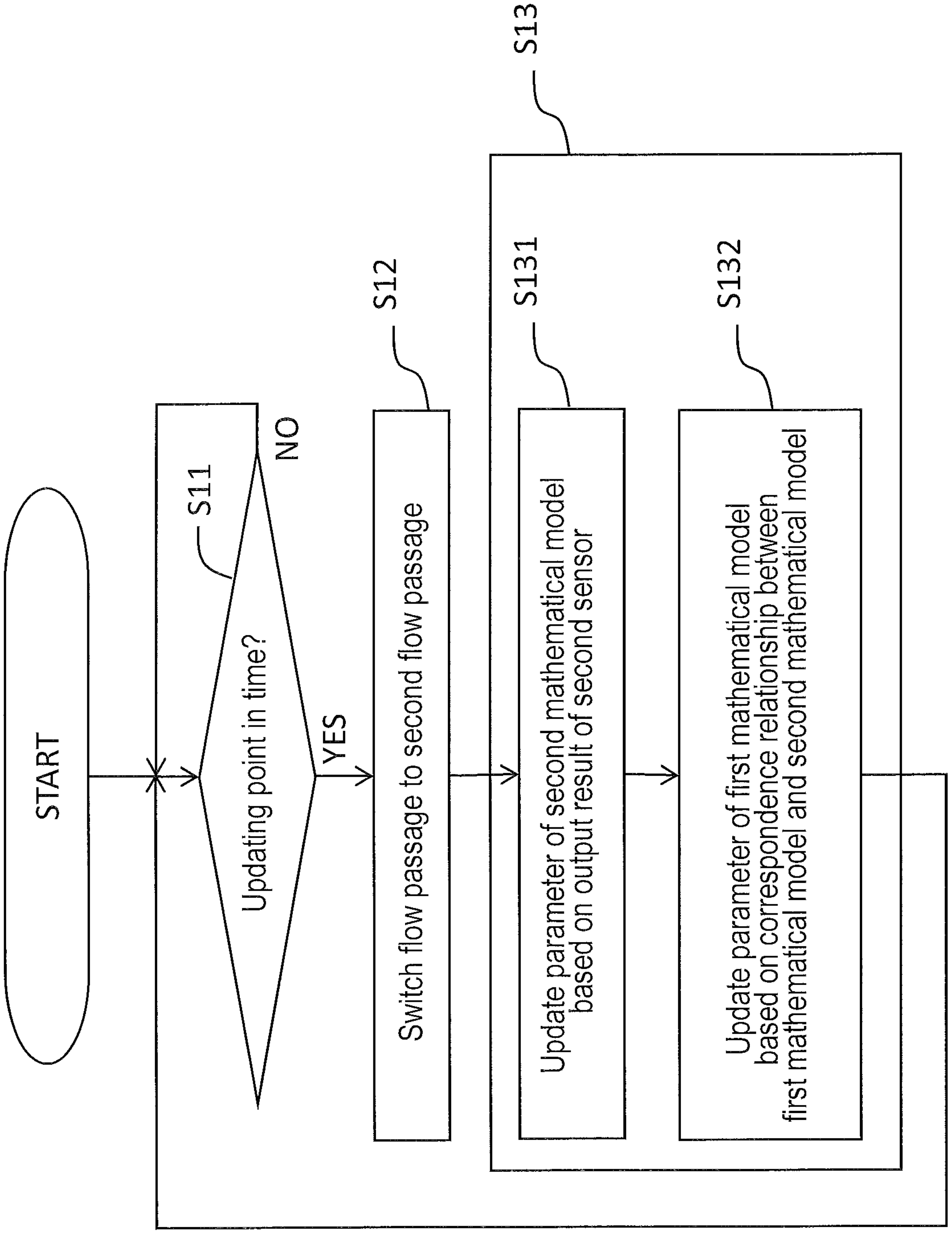
FIG. 8 is a flowchart illustrating the flow of a periodic calibration process.

During normal operation of the additive manufacturing apparatus 10, the flow passage switching valve 16 is set so that the powder from the powder feeder 11 flows through the first flow passage 15, and the processor 31 obtains the first flow rate of the powder flowing to the head 12 by substituting the detected value of the first sensor 13 into the first mathematical model MD1. The obtained first flow rate is output to the notification device 103 and displayed on, for example, a display of the operation panel 102. The periodic calibration process illustrated in FIG. 8 is executed at periodic points in time such as a point in time when the workpiece W to be produced in the additive manufacturing apparatus 10 is replaced with a new workpiece W or a point in time before or after starting the operation of a day. Referring to FIG. 8, first, at step S11, the processor 31 determines whether it is an updating point in time, that is, whether it is the above-described periodic point in time. When it is not the updating point in time (NO at step S11), the processor 31 waits until the updating point in time comes. When it is the updating point in time (YES at step S11), at step S12, the processor 31 controls so that the flow passage switching valve 16 switches the flow passage through which the powder is to be fed from the powder feeder 11 to the second flow passage 18.

Next, at step S13, the processor 31 executes an updating process of acquiring the output of the second sensor 19 that has detected the powder flowing through the second flow passage 18 after the flow passage switching valve 16 has switched the flow passage through which the powder is to be fed from the powder feeder 11 to the second flow passage 18, and updating the first mathematical model MD1 using the output, the first mathematical model MD1, and the second mathematical model MD2. That is, the method for controlling the additive manufacturing apparatus 10 includes the updating process of acquiring the output of the second sensor 19 that has detected the powder flowing through the second flow passage 18 after the flow passage switching valve 16 has switched the flow passage through which the powder is to be fed from the powder feeder 11 to the second flow passage 18, and updating the first mathematical model MID using the output, the first mathematical model MID1, and the second mathematical model MD2. The control program PG causes the processor 31 to execute the updating process of acquiring the output of the second sensor 19 that has detected the powder flowing through the second flow passage 18 after the flow passage switching valve 16 has switched the flow passage through which the powder is to be fed from the powder feeder 11 to the second flow passage 18, and updating the first mathematical model MD1 using the output, the first mathematical model MID1, and the second mathematical model MD2.

At step S13, specifically, at step S131, the processor 31 acquires the output of the second sensor 19 that has detected the powder flowing through the second flow passage 18 after the flow passage switching valve 16 has switched the flow passage through which the powder is to be fed from the powder feeder 11 to the second flow passage 18. At the same time, the processor 31 also acquires the changes over time in the weight on the measurement instrument SC1 mounted on the reservoir tank 17 and updates the parameter of the second mathematical model MD2 using the acquired changes over time as the flow rate of the powder. That is, the method for controlling the additive manufacturing apparatus 10 includes acquiring the output of the second sensor 19 that has detected the powder flowing through the second flow passage 18 after the flow passage switching valve 16 has switched the flow passage through which the powder is to be fed from the powder feeder 11 to the second flow passage 18. Furthermore, the controlling method also includes simultaneously acquiring the changes over time in the weight on the measurement instrument SC1 mounted on the reservoir tank 17 and updating the parameter of the second mathematical model MD2. The control program PG causes the processor 31 to execute the process of acquiring the output of the second sensor 19 that has detected the powder flowing through the second flow passage 18 after the flow passage switching valve 16 has switched the flow passage through which the powder is to be fed from the powder feeder 11 to the second flow passage 18. Furthermore, the control program PG causes the processor 31 to execute the processes of also simultaneously acquiring the changes over time in the weight on the measurement instrument SC1 mounted on the reservoir tank 17 and updating the parameter of the second mathematical model MD2. It is to be noted that the parameter of the second mathematical model MD2 is the above-mentioned parameter K2. In the following description, the updated parameter K2 is referred to as K2'.

At step S132, the processor 31 updates the parameter of the first mathematical model MD1 based on the correspondence relationship between the first mathematical model MD1 and the second mathematical model MD2. More specifically, the processor 31 updates the parameter K1 of the first mathematical model MD1 using the above-described ratio β. That is, the method for controlling the additive manufacturing apparatus 10 includes updating the parameter of the first mathematical model MD1 based on the correspondence relationship between the first mathematical model MD1 and the second mathematical model MD2. More specifically, the method for controlling the additive manufacturing apparatus 10 includes updating the parameter K1 of the first mathematical model MD1 using the above-described ratio β. The control program PG causes the processor 31 to execute the process of updating the parameter of the first mathematical model MD1 based on the correspondence relationship between the first mathematical model MD1 and the second mathematical model MD2.

More specifically, the control program PG causes the processor 31 to execute the process of updating the parameter K1 of the first mathematical model MD1 using the above-described ratio β. It is to be noted that when the updated K1 is referred to as K1', K1'=β×K2'.

Since the above-described updating process is executed at periodic points in time, the processor 31 is configured to repeat the updating process at a predetermined cycle. The method for controlling the additive manufacturing apparatus 10 repeats the updating process at a predetermined cycle. The control program PG causes the processor 31 to execute the process of repeating the updating process at a predetermined cycle. The above updating process allows the first mathematical model MD1 to be updated without removing the workpiece W from the additive manufacturing apparatus 10.

Detection of Abnormality in Additive Manufacturing Apparatus 10

The processor 31 is capable of determining an abnormality in the additive manufacturing apparatus 10 by comparing the output of the first sensor 13 with the output of the second sensor 19 when the powder feeder 11 is operated under the same operating condition. The operating condition of the power feeder 11 is defined by the rotational speed of the rotatable measurement disk and the flow rate of the carrier gas. It is to be noted that, in terms of determining the location of the abnormality in the powder feeder 11, the pipe cross-sectional shape of the first flow passage 15 and the pipe cross-sectional shape of the second flow passage 18 are preferably approximately the same. This is because when the operating condition of the powder feeder 11 is the same, the first flow rate of the powder flowing through the first flow passage 15 and the second flow rate of the powder flowing through the second flow passage 18 are approximately equal. Although a variety of methods may be used to determine whether there is an abnormality, two abnormality determining methods will be described below as examples.

Figure 9:
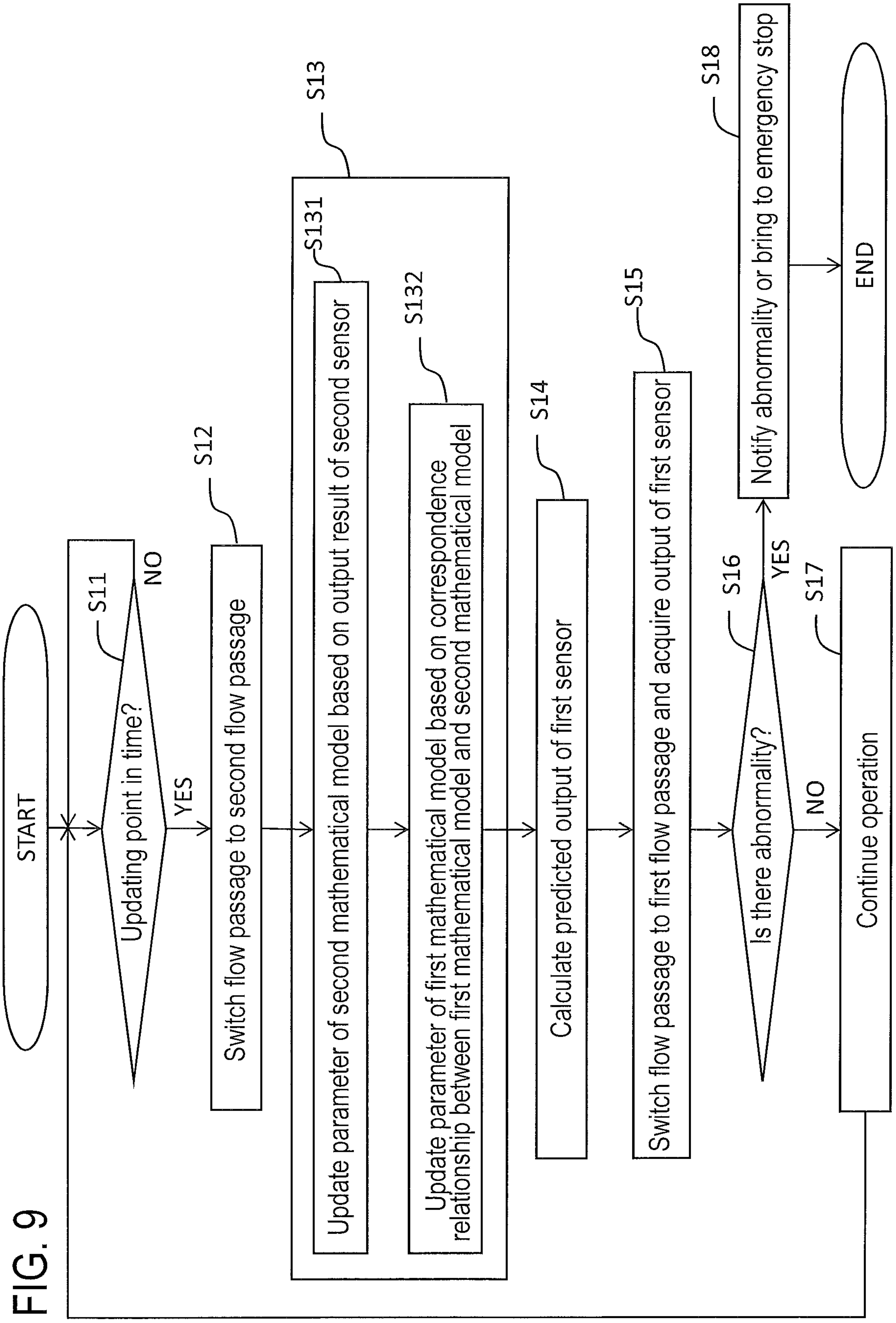
FIG. 9 is a flowchart illustrating an example flow of an abnormality determining process.

FIG. 9 is a flowchart illustrating an example flow of the abnormality determining process. FIG. 9 illustrates an example of the abnormality determining process combined with the periodic calibration process of FIG. 8. The present abnormality determining process is the same as the updating process up to step S132. At step S14, the processor 13 calculates a predicted output of the first sensor 13 when the powder feeder 11 feeds the powder to the first flow passage 15 under the same operating condition as when the powder feeder 11 feeds the powder to the second flow passage 18 using the output of the second sensor 19, the first mathematical model MID1, and the second mathematical model MD2. Specifically, since the parameter of the first mathematical model MD1 is updated at step S132, the processor 13 uses the updated parameter to calculate the predicted output of the first sensor 13 when the powder feeder 11 feeds the powder to the first flow passage 15 under the operating condition that achieves the flow rate of the powder measured by the measurement instrument SC1 at step S131. That is, the method for controlling the additive manufacturing apparatus 10 includes calculating the predicted output of the first sensor 13 when the powder feeder 11 feeds the powder to the first flow passage 15 under the same operating condition as when the powder feeder 11 feeds the powder to the second flow passage 18 using the output of the second sensor 19, the first mathematical model MID1, and the second mathematical model MD2. The method for controlling the additive manufacturing apparatus 10 includes calculating the predicted output of the first sensor 13 when the powder feeder 11 feeds the powder to the first flow passage 15 under the operating condition that achieves the flow rate of the powder measured by the measurement instrument SC1 at step S131 using the parameter of the first mathematical model MID updated at step S132. The control program PG causes the processor 31 to execute the process of calculating the predicted output of the first sensor 13 when the powder feeder 11 feeds the powder to the first flow passage 15 under the same operating condition as when the powder feeder 11 feeds the powder to the second flow passage 18 using the output of the second sensor 19, the first mathematical model MID, and the second mathematical model MD2. The control program PG causes the processor 31 to execute the process of calculating the predicted output of the first sensor 13 when the powder feeder 11 feeds the powder to the first flow passage 15 under the operating condition that achieves the flow rate of the powder measured by the measurement instrument SC1 at step S131 using the parameter of the first mathematical model MID updated at step S132.

At step S15, the processor 31 switches the flow passage through which the powder is to be fed to the first flow passage 15 and acquires the output of the first sensor 13 when the powder feeder 11 is operated under the operating condition that is the same as the operating condition that achieves the flow rate of the powder measured by the measurement instrument SC1 at step S131. That is, the method for controlling the additive manufacturing apparatus 10 includes switching the flow passage through which the powder is to be fed to the first flow passage 15 and acquiring the output of the first sensor 13 when the powder feeder 11 is operated under the operating condition that is the same as the operating condition that achieves the flow rate of the powder measured by the measurement instrument SC1 at step S131. The control program PG causes the processor 31 to execute the processes of switching the flow passage through which the powder is to be fed to the first flow passage 15 and acquiring the output of the first sensor 13 when the powder feeder 11 is operated under the operating condition that is the same as the operating condition that achieves the flow rate of the powder measured by the measurement instrument SC1 at step S131.

At step S16, the processor 31 executes a determining process of determining whether there is an abnormality in the additive manufacturing apparatus 10 by comparing the predicted output with the output of the first sensor 13 that has detected the powder flowing through the first flow passage 15 after the flow passage switching valve 16 has switched the flow passage through which the powder is to be fed from the powder feeder 11 to the first flow passage 15. The method for controlling the additive manufacturing apparatus 10 includes the determining process of determining whether there is an abnormality in the additive manufacturing apparatus 10 by comparing the predicted output with the output of the first sensor 13 that has detected the powder flowing through the first flow passage 15 after the flow passage switching valve 16 has switched the flow passage through which the powder is to be fed from the powder feeder 11 to the first flow passage 15. The control program PG causes the processor 31 to execute the determining process of determining whether there is an abnormality in the additive manufacturing apparatus 10 by comparing the predicted output with the output of the first sensor 13 that has detected the powder flowing through the first flow passage 15 after the flow passage switching valve 16 has switched the flow passage through which the powder is to be fed from the powder feeder 11 to the first flow passage 15. For example, when an absolute value of the difference between the output of the first sensor 13 and the predicted output is greater than a predetermined threshold value, it is determined that an abnormality has occurred in the additive manufacturing apparatus 10.

In response to determining that no abnormality has occurred in the additive manufacturing apparatus 10 (NO at step S16), the operation of the additive manufacturing apparatus 10 is continued at step S17, and the process returns to step S11. That is, the processor 31 is configured to repeat the determining process at a predetermined cycle. The method for controlling the additive manufacturing apparatus 10 repeats the determining process at a predetermined cycle. The control program PG causes the processor 31 to execute the process of repeating the determining process at a predetermined cycle.

In response to determining that an abnormality has occurred in the additive manufacturing apparatus 10 (YES at step S16), at step S18, the processor 31 controls the notification device 103 to raise an alarm or brings the additive manufacturing apparatus 10 to an emergency stop. That is, the method for controlling the additive manufacturing apparatus 10 includes, in response to determining that there is an abnormality, controlling the notification device 103 for providing information to a user to raise an alarm or bringing the additive manufacturing apparatus 10 to an emergency stop. The control program PG causes, in response to determining that there is an abnormality, the processor 31 to execute the process of controlling the notification device 103 for providing information to a user to raise an alarm or bringing the additive manufacturing apparatus 10 to an emergency stop.

With the above processes, it can be periodically determined whether the additive manufacturing apparatus 10 is operating properly using a spare time such as when the workpiece W is replaced without stopping the production of the workpiece W by the additive manufacturing apparatus 10. Besides the above-mentioned spare time, the determination may be made in every step of the additive manufacturing.

Figure 10:
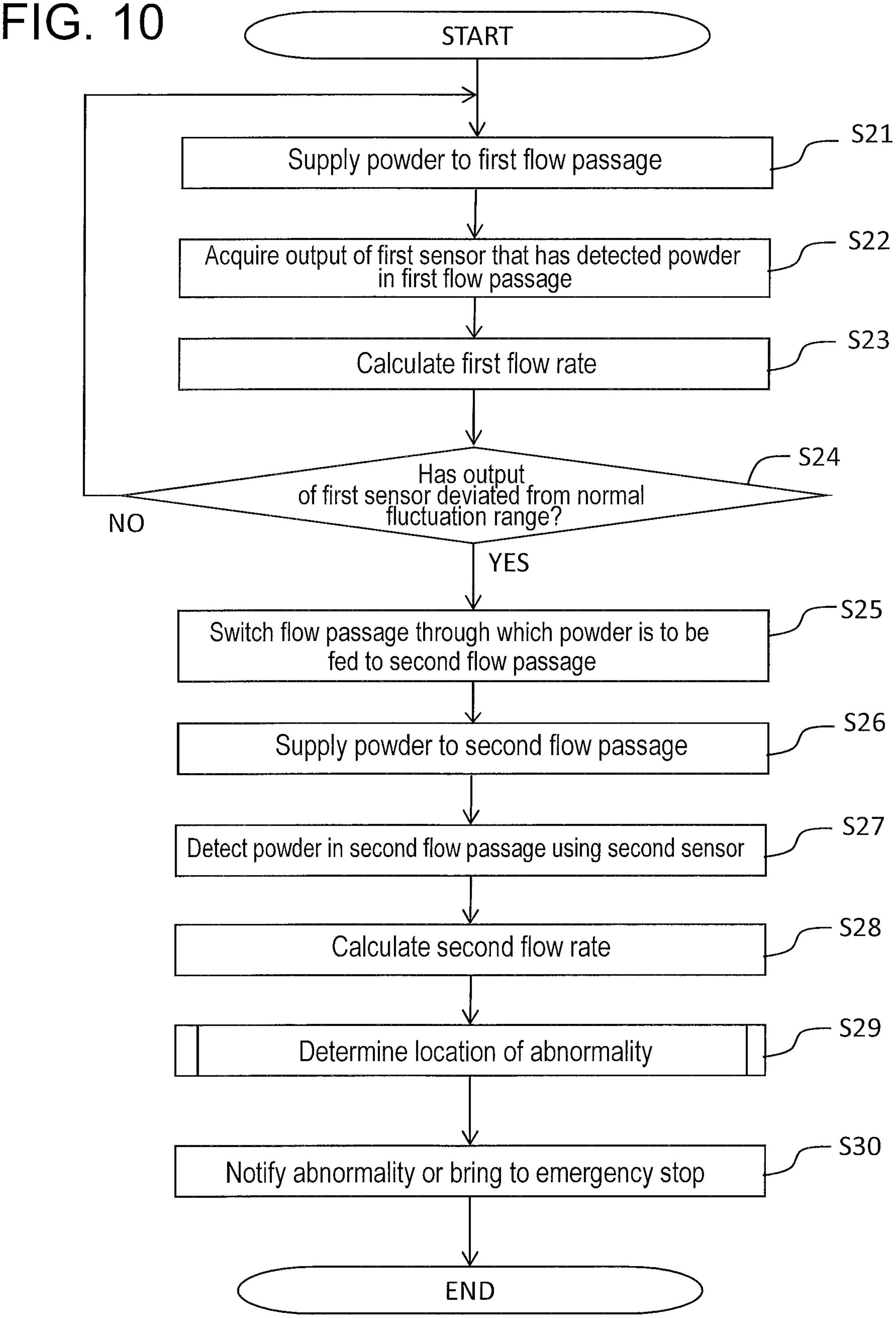
FIG. 10 is a flowchart illustrating another example flow of the abnormality determining process.

FIG. 10 is a flowchart illustrating another example flow of the abnormality determining process. At step S21, the processor 31 causes the powder feeder 11, which is set to a predetermined operating condition, to supply the powder to the first flow passage 15, which connects the powder feeder 11 to the head 12, to discharge the powder from the head 12. That is, the method for controlling the additive manufacturing apparatus 10 includes supplying the powder from the powder feeder 11, which is set to a predetermined operating condition, to the first flow passage 15, which connects the powder feeder 11 to the head 12, to discharge the powder from the head 12. The control program PG causes the processor 31 to execute the process of supplying the powder from the powder feeder 11, which is set to a predetermined operating condition, to the first flow passage 15, which connects the powder feeder 11 to the head 12, to discharge the powder from the head 12.

At step S22, the processor 31 acquires the output of the first sensor 13 that detects the powder flowing through the first flow passage 15. That is, the method for controlling the additive manufacturing apparatus 10 includes detecting the powder flowing through the first flow passage 15 using the first sensor 13. The control program PG causes the processor 31 to execute the process of acquiring the output of the first sensor 13 that detects the powder flowing through the first flow passage 15. At step S23, the processor 31 calculates the first flow rate of the powder flowing to the head 12 based on the output of the first sensor 13. That is, the method for controlling the additive manufacturing apparatus 10 includes calculating the first flow rate of the powder flowing to the head 12 based on the output of the first sensor 13. The control program PG causes the processor 31 to execute the process of calculating the first flow rate of the powder flowing to the head 12 based on the output of the first sensor 13.

At step S24, the processor 31 determines whether the output of the first sensor 13 has deviated from a normal fluctuation range while the powder is supplied to the head 12 from the powder feeder 11 operated under a regular operating condition. That is, the method for controlling the additive manufacturing apparatus 10 includes determining whether the output of the first sensor 13 has deviated from the normal fluctuation range while the powder is supplied to the head 12 from the powder feeder 11 operated under a regular operating condition. The control program PG causes the processor 31 to execute the process of determining whether the output of the first sensor 13 has deviated from the normal fluctuation range while the powder is supplied to the head 12 from the powder feeder 11 operated under a regular operating condition. The normal fluctuation range refers to a range in which the output of the first sensor 13 can be deemed normal from the first mathematical model MD1 and the operating condition of the powder feeder 11. The normal fluctuation range is obtained at the same time as when the first mathematical model MID is generated and is stored in the memory 32. For example, the powder feeder 11 is activated multiple times under the same operating condition when the first mathematical model MD1 is generated, and the normal fluctuation range may be set so that a value obtained by adding an offset to the maximum output of the first sensor 13 serves as the upper limit and a value obtained by subtracting an offset from the minimum output of the first sensor 13 serves as the lower limit. When the output of the first sensor 13 is within the normal fluctuation range (NO at step S24), the process returns to step S21.

When the output of the first sensor 13 deviates from the normal fluctuation range (YES at step S24), at step S25, the processor 31 switches the flow passage through which the powder is to be fed from the powder feeder 11 from the first flow passage 15 to the second flow passage 18, which connects the powder feeder 11 to the reservoir tank 17. That is, the method for controlling the additive manufacturing apparatus 10 includes switching the flow passage through which the powder is to be fed from the powder feeder 11 from the first flow passage 15 to the second flow passage 18, which connects the powder feeder 11 to the reservoir tank 17. The control program PG causes the processor 31 to execute the process of switching the flow passage through which the powder is to be fed from the powder feeder 11 from the first flow passage 15 to the second flow passage 18, which connects the powder feeder 11 to the reservoir tank 17.

At step S26, the processor 31 causes the powder feeder 11 that is set to the predetermined operating condition to feed the powder to the second flow passage 18. That is, the method for controlling the additive manufacturing apparatus 10 includes feeding the powder from the powder feeder 11 that is set to the predetermined operating condition to the reservoir tank 17 through the second flow passage 18. The control program PG causes the processor 31 to execute the process of making the powder feeder 11 that is set to the predetermined operating condition to feed the powder to the second flow passage 18. It is to be noted that the operating condition of the powder feeder 11 at step S21 is the same as the operating condition of the powder feeder 11 at step S26.

At step S27, the processor 31 acquires the output of the second sensor 19 that detects the powder flowing through the second flow passage 18. That is, the method for controlling the additive manufacturing apparatus 10 includes detecting the powder flowing through the second flow passage 18 using the second sensor 19. The control program PG causes the processor 31 to execute the process of acquiring the output of the second sensor 19 that detects the powder flowing through the second flow passage 18. At step S28, the processor 31 calculates the second flow rate of the powder flowing to the reservoir tank 17 based on the output of the second sensor 19. That is, the method for controlling the additive manufacturing apparatus 10 includes calculating the second flow rate of the powder flowing to the reservoir tank 17 based on the output of the second sensor 19. The control program PG causes the processor 31 to execute the process of calculating the second flow rate of the powder flowing to the reservoir tank 17 based on the output of the second sensor 19.

At step S29, the processor 31 determines whether an abnormality is in the powder feeder 11 or in at least one of the first flow passage 15 and the first sensor 13 based on the output of the first sensor 13 and the output of the second sensor 19. That is, the method for controlling the additive manufacturing apparatus 10 includes determining whether an abnormality is in the powder feeder 11 or in at least one of the units including the first flow passage 15 and the first sensor 13 based on the output of the first sensor 13 and the output of the second sensor 19. The control program PG causes the processor 31 to execute the process of determining whether an abnormality is in the powder feeder 11 or in at least one of the units including the first flow passage 15 and the first sensor 13 based on the output of the first sensor 13 and the output of the second sensor 19.

Figure 11:
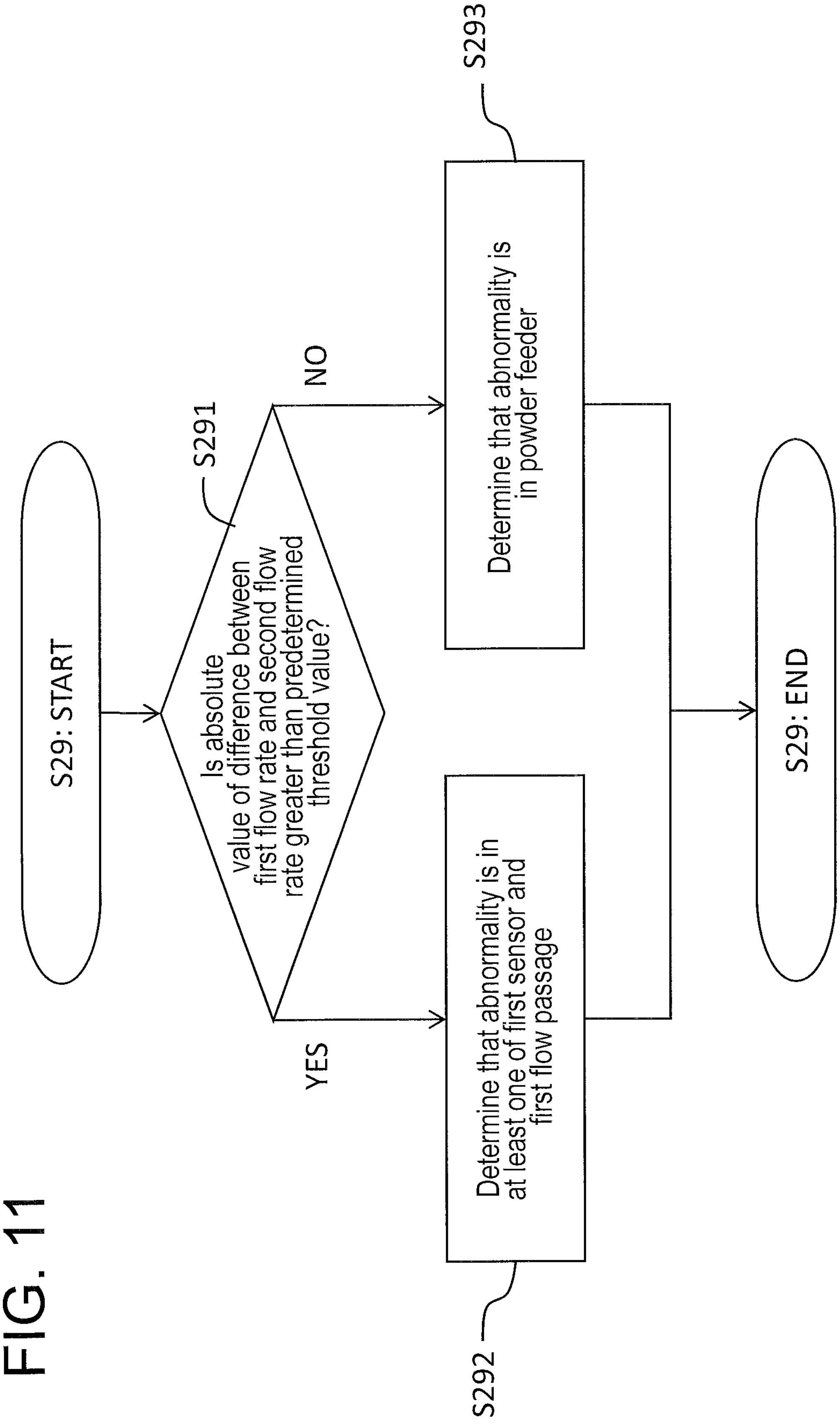
FIG. 11 is a flowchart illustrating an example flow of a process of determining an abnormality location.

FIG. 11 is a flowchart illustrating a flow of a detailed process of step S29. At step S291, the processor 31 determines whether an absolute value of the difference between the first flow rate calculated from the output of the first sensor 13 and the second flow rate calculated from the output of the second sensor 19 is greater than a predetermined threshold value. The method for controlling the additive manufacturing apparatus 10 includes determining whether the absolute value of the difference between the first flow rate calculated from the output of the first sensor 13 and the second flow rate calculated from the output of the second sensor 19 is greater than the predetermined threshold value. The control program PG causes the processor 31 to execute the process of determining whether the absolute value of the difference between the first flow rate calculated from the output of the first sensor 13 and the second flow rate calculated from the output of the second sensor 19 is greater than the predetermined threshold value. The predetermined threshold value is determined in advance and stored in the memory 32.

When the absolute value of the difference between the first flow rate and the second flow rate is greater than the predetermined threshold value (YES at step S291), at step S292, the processor 31 determines that an abnormality has occurred in at least one of the first sensor 13 and the first flow passage 15. That is, the method for controlling the additive manufacturing apparatus 10 includes determining that an abnormality has occurred in at least one of the first sensor 13 and the first flow passage 15 when the absolute value of the difference between the first flow rate and the second flow rate is greater than the predetermined threshold value. The control program PG causes the processor 31 to execute the process of determining that an abnormality has occurred in at least one of the first sensor 13 and the first flow passage 15 when the absolute value of the difference between the first flow rate and the second flow rate is greater than the predetermined threshold value.

When the absolute value of the difference between the first flow rate and the second flow rate is less than or equal to the predetermined threshold value (NO at step S291), at step S293, the processor 31 determines that an abnormality has occurred in the powder feeder 11. That is, the method for controlling the additive manufacturing apparatus 10 includes determining that an abnormality has occurred in the powder feeder 11 when the absolute value of the difference between the first flow rate and the second flow rate is less than or equal to the predetermined threshold value. The control program PG causes the processor 31 to execute the process of determining that an abnormality has occurred in the powder feeder 11 when the absolute value of the difference between the first flow rate and the second flow rate is less than or equal to the predetermined threshold value.

Operations and Effects of the Embodiments

The additive manufacturing apparatus 10, the multi-tasking apparatus 100, the method for controlling the additive manufacturing apparatus 10, and the control program PG for the additive manufacturing apparatus 10 according to the present embodiment switch from the first flow passage 15, which connects the powder feeder 11 to the head 12, to the second flow passage 18, which connects the powder feeder 11 to the reservoir tank 17, and calculate the first flow rate of the powder flowing to the head 12 and the second flow rate of the powder flowing to the reservoir tank 17. Thus, even if an abnormality occurs in the additive manufacturing apparatus 10, the cause of the abnormality can be investigated without removing the workpiece W from the additive manufacturing apparatus 10. Additionally, in the additive manufacturing apparatus 10, the powder feeder 11 can be checked for proper operation or the first sensor 13 can be calibrated while the workpiece W is not machined such as during transferring.

Modification

The abnormality determining method according to the present embodiment is not intended as limiting and may be other methods as long as the abnormality determining method utilizes the configuration of the additive manufacturing apparatus 10 described in the embodiment. Additionally, the measurement instrument SC1 and the additional measurement instrument SC2 are not limited to a weight scale and may be one that measures the volume of the powder. In this case, the flow rate of the powder may be the volume of the powder that flowed through each of the first flow passage 15 and the second flow passage 18 per unit time.

When the method that expresses the periodic calibration process and the abnormality determining process illustrated in the present embodiment in a more generic concept is referred to as the method for controlling the additive manufacturing apparatus 10, the method for controlling the additive manufacturing apparatus 10 includes at least steps S21 to S23 and steps S25 to S27 of FIG. 10. Additionally, the control program PG for the additive manufacturing apparatus 10 causes the processor 31 to execute the processes of at least steps S21 to S23 and steps S21 to 27 of FIG. 10. It is to be noted, however, that the processes other than the above-described periodic calibration process and the abnormality determination process may be replaced with other processes.

The control program PG described above does not necessarily have to be the one stored in the memory 32 integrated in the controller CL but may be the one that is stored in a storage medium removable from the controller CL and readable by the controller CL including, for example, disks such as a floppy disk, an optical disk, a CD-ROM, or a magnetic disk, an SD card, a USB memory, or an external hard disk.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present disclosure may be practiced otherwise than as specifically described herein.

What is claimed is:

1. An additive manufacturing apparatus comprising:

a powder feeder configured to feed powder using a carrier gas;

a head configured to discharge the powder;

a first flow passage connecting the powder feeder and the head;

a flow passage switching valve provided in the first flow passage;

a reservoir tank configured to receive the powder fed from the powder feeder;

a second flow passage connecting the flow passage switching valve to the reservoir tank;

a first sensor provided in the first flow passage between the flow passage switching valve and the head to detect a first flow rate of the powder flowing to the head;

a second sensor provided in the second flow passage to detect a second flow rate of the powder flowing to the reservoir tank;

the flow passage switching valve being configured to take a first position and a second position alternatively, the powder feeder being connected to the head via the first flow passage in the first position to supply the powder to the head, the powder feeder being connected to the reservoir tank via the second flow passage in the second position to supply the powder to the reservoir tank;

a memory configured to store a first mathematical model, which describes a relationship between an output of the first sensor and the first flow rate of the powder, and a second mathematical model, which describes a relationship between an output of the second sensor and the second flow rate of the powder; and a processor configured to calculate the first flow rate from the output of the first sensor based on the first mathematical model and the second flow rate from the output of the second sensor based on the second mathematical model, wherein the processor is configured to determine whether an abnormality occurs in the additive manufacturing apparatus by comparing the output of the first sensor when the powder is fed to the head from the powder feeder operated under a predetermined operating condition with the output of the second sensor when the powder is fed to the second flow passage from the powder feeder operated under the predetermined operating condition, wherein, when a second output of the first sensor deviates from a normal fluctuation range while the powder is supplied to the head from the powder feeder operated under a regular operating condition, the processor is configured to control the flow passage switching valve to take the second position, acquire a third output of the second sensor that has detected the powder flowing to the reservoir tank from the powder feeder operated under the regular operating condition, and determine whether the abnormality occurs in the powder feeder or in at least one of the first flow passage and the first sensor based on the second output of the first sensor and the third output of the second sensor.

2. The additive manufacturing apparatus according to claim 1, further comprising a measurement instrument configured to measure the amount of powder accumulated in the reservoir tank, wherein the second mathematical model is generated based on a correspondence relationship between a change in the amount in the reservoir tank per unit time and the output of the second sensor corresponding to the change in the reservoir tank.

3. The additive manufacturing apparatus according to claim 1, wherein the amount of powder discharged from the head to a container, which is located opposite to an outlet of the head to receive the powder, is measured, and wherein the first mathematical model is generated based on a correspondence relationship between a change in the amount in the container per unit time and the output of the first sensor corresponding to the change in the container.

4. The additive manufacturing apparatus according to claim 1, wherein the processor is configured to execute an updating process in which the processor acquires a first output of the second sensor that has detected the powder flowing through the second flow passage after the flow passage switching valve takes the second position and in which the processor updates the first mathematical model based on the first output, the first mathematical model, and the second mathematical model.

5. The additive manufacturing apparatus according to claim 1, wherein, when an absolute value of a difference between the first flow rate calculated from the second output of the first sensor and the second flow rate calculated from the third output of the second sensor is greater than a predetermined threshold value, the processor is configured to determine that the abnormality occurs in at least one of the first sensor and the first flow passage.

6. The additive manufacturing apparatus according to claim 1, wherein, when an absolute value of a difference between the first flow rate calculated from the second output of the first sensor and the second flow rate calculated from the third output of the second sensor is less than or equal to a predetermined threshold value, the processor is configured to determine that an abnormality occurs in the powder feeder.

7. The additive manufacturing apparatus according to claim 1, further comprising a notification device configured to provide information to a user, wherein, in response to determining the abnormality, the processor is configured to control the notification device to raise an alarm or to bring the additive manufacturing apparatus to an emergency stop.

8. The additive manufacturing apparatus according to claim 1, wherein each of the first sensor and the second sensor includes an optical sensor, and wherein the first flow passage comprises a first transmissive window through which a light of the first sensor passes, and the second flow passage comprises a second transmissive window through which a light of the second sensor passes.

9. The additive manufacturing apparatus according to claim 2, wherein the amount of powder discharged from the head to a container, which is located opposite to an outlet of the head to receive the powder, is measured, and wherein the first mathematical model is generated based on a correspondence relationship between a change in the amount in the container per unit time and the output of the first sensor corresponding to the change in the container.

10. The additive manufacturing apparatus according to claim 2, wherein the processor is configured to execute an updating process in which the processor acquires a first output of the second sensor that has detected the powder flowing through the second flow passage after the flow passage switching valve has taken the second position and in which the processor updates the first mathematical model based on the first output, the first mathematical model, and the second mathematical model.

11. The additive manufacturing apparatus according to claim 3, wherein the processor is configured to execute an updating process in which the processor acquires a first output of the second sensor that has detected the powder flowing through the second flow passage after the flow passage switching valve has taken the second position and in which the processor updates the first mathematical model based on the first output, the first mathematical model, and the second mathematical model.

12. The additive manufacturing apparatus according to claim 4, wherein the processor is configured to repeat the updating process at a predetermined cycle.

13. A multi-tasking apparatus comprising:

the additive manufacturing apparatus according to claim 1; and a cutting device configured to perform a cutting process.

* * * * *